US009058216B2

(12) United States Patent
Frean et al.

(10) Patent No.: US 9,058,216 B2
(45) Date of Patent: Jun. 16, 2015

(54) METHOD FOR ESTIMATING JOB RUN TIME

(75) Inventors: Marcus Frean, Wellingtong (NZ); David Kydd, Wellington (NZ); Chris Teeling, Wellingtong (NZ); Josiah Jordan, Wellingtong (NZ); Anna Tisch, Wellington (NZ); Peter Soukalopoulos, Wellington (NZ); Peter De Vocht, Wellington (NZ); Tim Hogan, Wellington (NZ); Scott Houston, Kapiti (NZ); Dave Fellows, Porirua (NZ); Darryl Lundy, Wellington (NZ); John Adrian, Wellington (NZ)

(73) Assignee: Green Button Limited (NZ)

( * ) Notice: Subject to any disclaimer, the term of this patent is extended or adjusted under 35 U.S.C. 154(b) by 107 days.

(21) Appl. No.: 13/808,203

(22) PCT Filed: Jul. 8, 2011

(86) PCT No.: PCT/NZ2011/000128
§ 371 (c)(1),
(2), (4) Date: Dec. 31, 2013

(87) PCT Pub. No.: WO2012/005611
PCT Pub. Date: Jan. 12, 2012

(65) Prior Publication Data
US 2014/0115592 A1 Apr. 24, 2014

Related U.S. Application Data

(60) Provisional application No. 61/372,258, filed on Aug. 10, 2010.

(30) Foreign Application Priority Data

Jul. 8, 2010 (NZ) ........................................ 586691

(51) Int. Cl.
*G06F 9/46* (2006.01)
*G06F 17/00* (2006.01)
*G06F 9/50* (2006.01)

(52) U.S. Cl.
CPC ................... *G06F 9/5027* (2013.01)

(58) Field of Classification Search
None
See application file for complete search history.

(56) References Cited

U.S. PATENT DOCUMENTS

2004/0044600 A1  3/2004 Chu et al.
2004/0205108 A1  10/2004 Tanaka
(Continued)

FOREIGN PATENT DOCUMENTS

JP  2009-266044  11/2009

OTHER PUBLICATIONS

Predicting the Execution Time of Grid Workflow Applications through Local Learning Farrukh Nadeem and Thomas Fahringer Published: Nov. 20, 2009.*
(Continued)

*Primary Examiner* — Emerson Puente
*Assistant Examiner* — Paul Mills
(74) *Attorney, Agent, or Firm* — Ben Tabor; Dolan Stein; Micky Minhas

(57) ABSTRACT

A process controller adapted to provide an estimated prediction of a processing time for a data processing job to be run on one or more of a plurality of data processing devices that operate within a distributed processing system having a range of platforms, the process controller being in communication with a job prediction engine adapted to calculate an estimated processing time associated with the data processing job, wherein the process controller uses the estimated processing time to determine the estimated prediction and is further adapted to control the assignment of the data processing job to the data processing devices upon acceptance of the estimated prediction by a user.

58 Claims, 9 Drawing Sheets

(56) References Cited

U.S. PATENT DOCUMENTS

2008/0294937 A1 11/2008 Ueda
2009/0172093 A1 7/2009 Matsubara

OTHER PUBLICATIONS

Distributed Resource Selection in Grid Using Decision Theory Lilian Noronha Nassif, JoséMarcos Nogueira, Flávio Vinícius de Andrade Published: 2007.*

Performance modeling of parallel applications for grid scheduling H.A. Sanjay, Sathish Vadhiyar Published: 2008.*

Time and Cost-Driven Scheduling of Data Parallel Tasks in Grid Workflows Nadia Ranaldo and Eugenio Zimeo Published: Feb. 25, 2009.*

Trace-Based Evaluation of Job Runtime and Queue Wait Time Predictions in Grids Ozan Sonmez, Nezih Yigitbasi, Alexandru Iosup, Dick Epema Published: Jun. 13, 2009.*

"Office Action Issued in New Zealand Patent Application No. 607113", Mailed Date: Apr. 14, 2014, 2 pages.

"Office Action Issued in New Zealand Patent Application No. 629035", Mailed Date: Aug. 26, 2014, 2 pages.

* cited by examiner $$\begin{bmatrix} P(1,1) & \cdots & P(i,1) & \cdots & P(M,1) \\ \vdots & & \vdots & & \vdots \\ P(1,j) & \cdots & P(i,j) & \cdots & P(M,j) \\ \vdots & & \vdots & & \vdots \\ P(1,N) & \cdots & P(i,N) & \cdots & P(M,N) \\ T(1) & \cdots & T(i) & \cdots & T(M) \end{bmatrix} \rightarrow \begin{bmatrix} P(1,1) & \cdots & P(i,1) & \cdots & P(M,1) & P(M+1,1) \\ \vdots & & \vdots & & \vdots & \vdots \\ P(1,j) & \cdots & P(i,j) & \cdots & P(M,j) & P(M+1,j) \\ \vdots & & \vdots & & \vdots & \vdots \\ P(1,N) & \cdots & P(i,N) & \cdots & P(M,N) & P(M+1,N+1) \\ T(1) & \cdots & T(i) & \cdots & T(M) & T(M+1) \end{bmatrix}$$

Figure 10

$$\begin{bmatrix} P(1,1) & \cdots & P(i,1) & \cdots & P(M,1) \\ \vdots & & \vdots & & \vdots \\ P(1,j) & \cdots & P(i,j) & \cdots & P(M,j) \\ \vdots & & \vdots & & \vdots \\ P(1,N) & \cdots & P(i,N) & \cdots & P(M,N) \\ T(1) & \cdots & T(i) & \cdots & T(M) \end{bmatrix} \rightarrow \begin{bmatrix} P(1,1) & \cdots & P(i,1) & & \cdots & P(M,1) \\ \vdots & & \vdots & & & \vdots \\ P(1,j) & \cdots & P(i,j) & & \cdots & P(M,j) \\ \vdots & & \vdots & & & \vdots \\ P(1,N) & \cdots & P(i,N) & & \cdots & P(M,N) \\ T(1) & \cdots & (T(i) + Tnew)/2 & \cdots & T(M) \end{bmatrix}$$

Figure 11

METHOD FOR ESTIMATING JOB RUN TIME

This application is a National Stage Application of PCT/NZ2011/000128, filed 8 Jul. 2011, which claims benefit of Serial No. 586691, filed 8 Jul. 2010 in New Zealand and U.S. Provisional Application No. 61/372,258 filed 10 Aug. 2010 and which applications are incorporated herein by reference. To the extent appropriate, a claim of priority is made to each of the above disclosed applications.

FIELD OF THE INVENTION

The present invention relates to a method or system for the estimation of computer job run times. In particular, the present invention relates to a method for the estimation of computer run times for a job being processed on one or more processing devices in a distributed processing system having a range of platforms.

BACKGROUND TO THE INVENTION

It is common to perform complex and/or time intensive computing on special, high powered static or fixed platform computer systems possibly incorporating many different central processing units or even physical computers. Often use of the computers is charged based on computing time, which is typically a combination of the number of processors used for a computing job and the time they are used for. However it is sometimes difficult to predict how long the job will go for, and therefore it is difficult to predict the cost of running a job.

Historically, such computing was performed by specialists, who knew from experience and the design of their programs and platforms roughly how long the job would take. It was also common that jobs were performed by entities with the resources to run a job without worrying about the cost.

However, modern computing projects, for example computer animation, may not require a user to have an in depth knowledge of how a computer program works or how much computing power a particular job may require. These users may wish to use a computing system but may not have the resources to be able to afford a longer than expected run.

Further, within "cloud" infrastructure environments, the infrastructure type, configurations, platforms and location are often unknown by the end user. Again, as in static or fixed computing environments, use of available computers in "cloud" environments is charged based on computing time. Again, it is sometimes difficult to predict how long a particular job will take to process and the volume of resources it will use. Therefore, it can be difficult to predict the cost of running a job within the "cloud".

In order to perform job run-time estimation, personal benchmarks on a set infrastructure environment were required. Alternatively, these jobs were performed by entities with existing capitalised resources to run a job without the need to manage job specific, time based business cost.

Further, modern computing projects, may not require a user of an application to have an in depth knowledge of how a computer program works or how much computing power a job may require. These users may wish to use a cloud computing system where they will pay at the completion of the job based on consumption of resources for a given time period, where that time period is not understood when they initiate the job.

It is an object of the present invention to provide a system for providing an accurate estimation of a potential job run time and/or an expected cost for the job It is a further object of the present invention to provide a system where a user may optionally commit to running a job based on a present estimated job run time.

Each object is to be read disjunctively with the object of at least providing the public with a useful choice.

SUMMARY OF THE INVENTION

According to a first aspect, the present invention provides a computer implemented method for estimating a processing time for a data processing job to be run on a data processing device including the steps of: creating an input array containing one or more parameters; using a scoring algorithm to obtain a closest neighbouring array by comparing the input array to a plurality of known arrays; for at least one parameter of the input array, using the closest neighbouring array and at least one other neighbouring array to determine a variation in estimated processing time; and providing a processing time estimate that is a combination of the processing time of a closest neighbouring array and the variation in estimated processing time.

According to a second aspect, the present invention provides a computer implemented method for estimating a processing time for a data processing job to be run on a data processing device including the steps of: creating an input array containing one or more parameters; using a scoring algorithm to obtain a plurality of neighbouring arrays; for at least one parameter in the input array, using a plurality of the neighbouring arrays to determine an estimated processing time.

According to a third aspect, the present invention provides a computer implemented method for estimating a processing time for a data processing job to be run on at least one data processing device that operates within a distributed processing system having a range of platforms, the method including the steps of: receiving instructions for executing a data processing job; based on the received instructions, utilising a prediction algorithm associated with a type of application to estimate the processing time for the data processing job; and delivering the predicted estimated processing time.

According to a fourth aspect, the present invention provides a computer implemented method of training an optimised time estimation system for completing a data processing job to be run on at least one data processing device that operates within a distributed processing system having a range of platforms, the method including the steps of: creating a prediction algorithm based upon retrieved operational parameters associated with a data processing job, retrieving further operational parameters associated with the data processing job, and updating the prediction algorithm based on the further operational parameters, wherein the prediction algorithm is updated by modifying parameter values associated with variable parameters of the prediction algorithm.

According to a fifth aspect, the present invention provides a computer implemented method of training an optimised time estimation system for completing a data processing job to be run on at least one data processing device that operates within a distributed processing system having a range of platforms, the method including the steps of: creating a prediction algorithm based upon retrieved operational parameters associated with a data processing job, retrieving further operational parameters associated with the data processing job, and updating the prediction algorithm based on the further operational parameters, wherein the prediction algorithm is updated by modifying parameter values associated with variable parameters of the prediction algorithm.

According to a sixth aspect, the present invention provides a computer implemented method of determining an optimised time estimation for completing a data processing job to be run on at least one data processing device that operates within a distributed processing system having a range of platforms, the method including the steps of: utilising a prediction algorithm to receive a predicted time estimation for completing a data processing job using at least one data processing device, modifying the predicted time estimation based on one or more parameters associated with the processing devices within the distributed processing system.

According to a seventh aspect, the present invention provides a process controller adapted to provide an estimated prediction of a processing time for a data processing job to be run on one or more of a plurality of data processing devices that operate within a distributed processing system having a range of platforms, the process controller being in communication with a job prediction engine adapted to calculate an estimated processing time associated with the data processing job, wherein the process controller uses the estimated processing time to determine the estimated prediction and is further adapted to control the assignment of the data processing job to the data processing devices upon acceptance of the estimated prediction by a user.

According to an eighth aspect, the present invention provides a process controller adapted to train an optimised time estimation system for completing a data processing job to be run on one or more of a plurality of data processing devices that operate within a distributed processing system having a range of platforms, wherein the process controller is adapted to: create a prediction algorithm based upon retrieved operational parameters associated with a data processing job, retrieve further operational parameters associated with the data processing job, and update the prediction algorithm based on the further operational parameters, wherein the prediction algorithm is updated by modifying parameter values associated with variable parameters of the prediction algorithm.

According to a nine aspect, the present invention provides a process controller adapted to determine an optimised time estimation for completing a data processing job to be run on one or more of the plurality of data processing devices that operate within a distributed processing system having a range of platforms, the process controller adapted to: utilise a stored prediction algorithm to receive a predicted time estimation for completing a data processing job using at least one data processing device, and modify the predicted time estimation based on one or more parameters associated with the processing devices within the distributed processing system.

BRIEF DESCRIPTION OF THE DRAWINGS

The invention will now be described by way of example only, with reference to the accompanying drawings, in which:

FIG. 10 shows a matrix updating algorithm according to an embodiment of the present invention; and FIG. 11 shows a further matrix updating algorithm according to an embodiment of the present invention.

DETAILED DESCRIPTION

The following description describes a method for estimating job run-time in a digital processing system having a number of processing devices which may operate on a range of different platforms. That is, the processing devices operate within the "cloud", where a number of different platforms are available for use by a user. It will be understood that the cloud may be accessible by the public or may be a private cloud.

The herein described method estimates the processing time for a job associated with a particular application, where a user or system submits a job that is to be executed using a configuration of infrastructure in the cloud which is not necessarily known at the time by the user or system. For example, the availability of the various platforms within the cloud may not be known to the user or system.

A system and method is described that produces an estimation of a job run-time or processing time for a job associated with a particular application using a distributed processing system infrastructure including a plurality of processing devices that operate on a range of different platforms.

Figure 1:
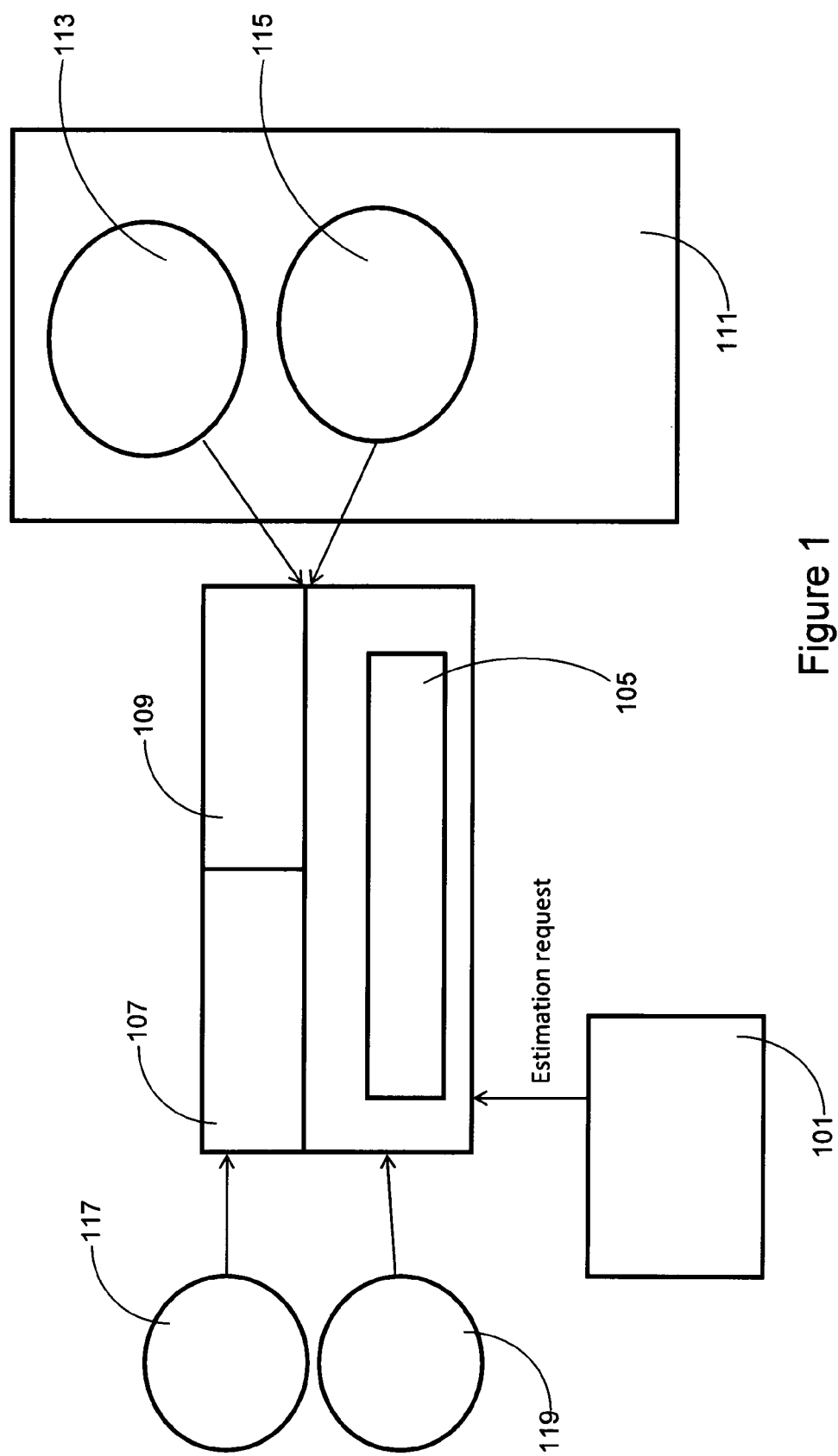
FIG. 1 shows an overview of the system according to an embodiment of the present invention.

FIG. 1 shows a system block diagram of a number of components that make up the system. The system block diagram includes a user terminal 101 which communicates with the rest of the system via the Internet. It will be understood that, the user terminal may communicate with the rest of the system by any other suitable means other than the Internet.

The user terminal provides a time-estimation request to the system. The time estimation request may be sent by a user through a manual process, or sent via a computing device automatically based on the received instructions from another device.

The system includes a prediction engine 103 which utilises a number of serialised algorithms 105, which are algorithm programs as described in more detail below. The system also includes a commercial engine 107 which interacts with the user terminal and the prediction engine. Further, an optimisation engine 109 is in communication with the commercial engine to optimise the results provided to the use terminal.

The system also receives job information 117 as well as job and user application features 119, as will be described in more detail below.

The system is in communication with various pieces of infrastructure that are forming part of one or more clouds 111. For example, a first set of infrastructure 113 is associated with a first cloud and has a number of associated configurations. A second set of infrastructure 115 is associated with a second cloud and has a number of associated configurations. The cloud infrastructure, machine location, configuration and machine type are not known to the user.

In order for the system to accurately predict the time taken to complete a requested job as well as the estimated cost for performing the job, it is required that the system is trained by using data that has been collected from the previous execution of various applications within the cloud.

Data is gathered when various jobs associated with these different applications are being executed within the cloud. For example, the applications may be run using a single system configuration or multiple system configuration. Further, the applications may be run using any number of different platforms. Therefore, data sets are gathered for executing jobs using various applications on multiple different configurations and platforms.

During this process, for every new application that is being run in the cloud, the job history for that application is collected and a job descriptor matrix is populated with the job descriptors associated with that application. Also collected are the runtimes associated with the execution of each of the applications. Therefore real world data is collected from the cloud through passive monitoring of the execution of jobs using various applications.

In addition, specific applications may be executed by the system in order to obtain job history information and create job descriptors for the purposes of providing estimated job run-time information to a user. For example, if a new application becomes available which is particularly computer intensive to operate, it is likely that a user will in the near future require an estimate for operating the application within the cloud. Therefore, a copy of the new application may be loaded onto the system in order to execute the application using various parameters. This creates a set of job history data associated with the new application. This job history data may then be used to create a new set of job descriptors that can in the future be used to estimate the job runtime and cost for executing the new application in the cloud.

It will be understood that the term application relates to a software application that may be operated or executed upon a computing device. In application effectively has a particular purpose such as animating, processing financial data (or indeed any other type of data), rendering, or any other form of intensive computing.

At regular intervals, this training data is used to train the algorithms used within the prediction engine. Training may mean that the algorithms used within the prediction engine are updated, modified or replaced for a specific application based on the newly collected data associated with that application.

The purpose of the training data is to tune the algorithms to make the predictions more accurate. For example, statistically speaking, the tuning of the algorithm may take into account outliers associated with the training data.

It will be understood that, as an alternative, the training data may be collected for a specific application that is being executed using various different configurations or infrastructure available within the cloud. That is, a specific application may be executed using a first configuration or infrastructure. Later, the same application may be executed using a different configuration or infrastructure. Data may be collected that is associated with the execution of this specific application using the different configurations or infrastructure sets. This therefore provides multiple sets of training data that are specific to a single application executed using different configurations or infrastructure within the cloud.

In order to update the algorithm programs used by the prediction engine to make them more accurate over time, the collected training data (see above) is used to modify parameters associated with the algorithm programs. The modified algorithms are then used to create the updated algorithm programs. The new algorithm programs are then stored in the prediction engine.

According to this embodiment, there is a single algorithm program for use for all applications of a particular type.

Therefore, a number of algorithm programs are stored within the prediction engine. Each algorithm program stored within the prediction engine has been created to predict a job run-time estimate for a specific type of application. This is because certain algorithm programs are more suited for determining runtimes for specific application types.

For example, the application for which job run-time estimation is required may be a digital media application. Therefore, the algorithm program required to create the job run-time estimation has been specifically created based on the requirements of this type of application. For example, a digital media application may require a neural network algorithm in order to predict the estimated run-time for executing such an application.

As a further example, the application may be associated with a financial services type of application in which case a different algorithm program would be used to predict the job run-time. That different algorithm program would be used for all financial services types of application. For example, a financial services application may require an algorithm program that effectively estimates the job run-time using a linear process as the financial services application operates in a linear manner.

As explained above, an algorithm program is associated with a particular set of application types. A specific application type uses a specific algorithm program that matches the application's operation.

For example, a table may be provided that associates a particular application or application type with a specific algorithm program.

As an alternative, each application may be associated with a specific single algorithm program. That is, there may be a one-to-one relationship between the algorithm programs and the applications.

It will be understood that the method for the selection of a particular algorithm program for use with estimating the run-time for a particular application may follow the same steps as described herein.

As an alternative, in order to associate a particular application with a suitable algorithm program, the job features associated with an application (such as the tasks associated with the application, sub components of the tasks and their characteristics or parameters, further subsets associated with the sub components, redundancy in computation due to repeated tasks etc) may be extracted from the training data and analysed to determine which of the algorithms are most suitable. For example, the analysis may determine whether the process required is a linear process (in which case a linear algorithm program is selected) or requires a number of complex iterations (in which case a neural network algorithm program is selected).

An updated version of the selected algorithm may then be created based upon the collected job descriptor information and timings from previous jobs. After modifying the selected algorithm, an updated algorithm program is created. For example, any suitable algorithm may be used to optimise parameters used within the selected algorithm. For example, as expanded in more detail below, a conjugate gradient algorithm may be used for optimising the parameters within the algorithm.

Figure 2:
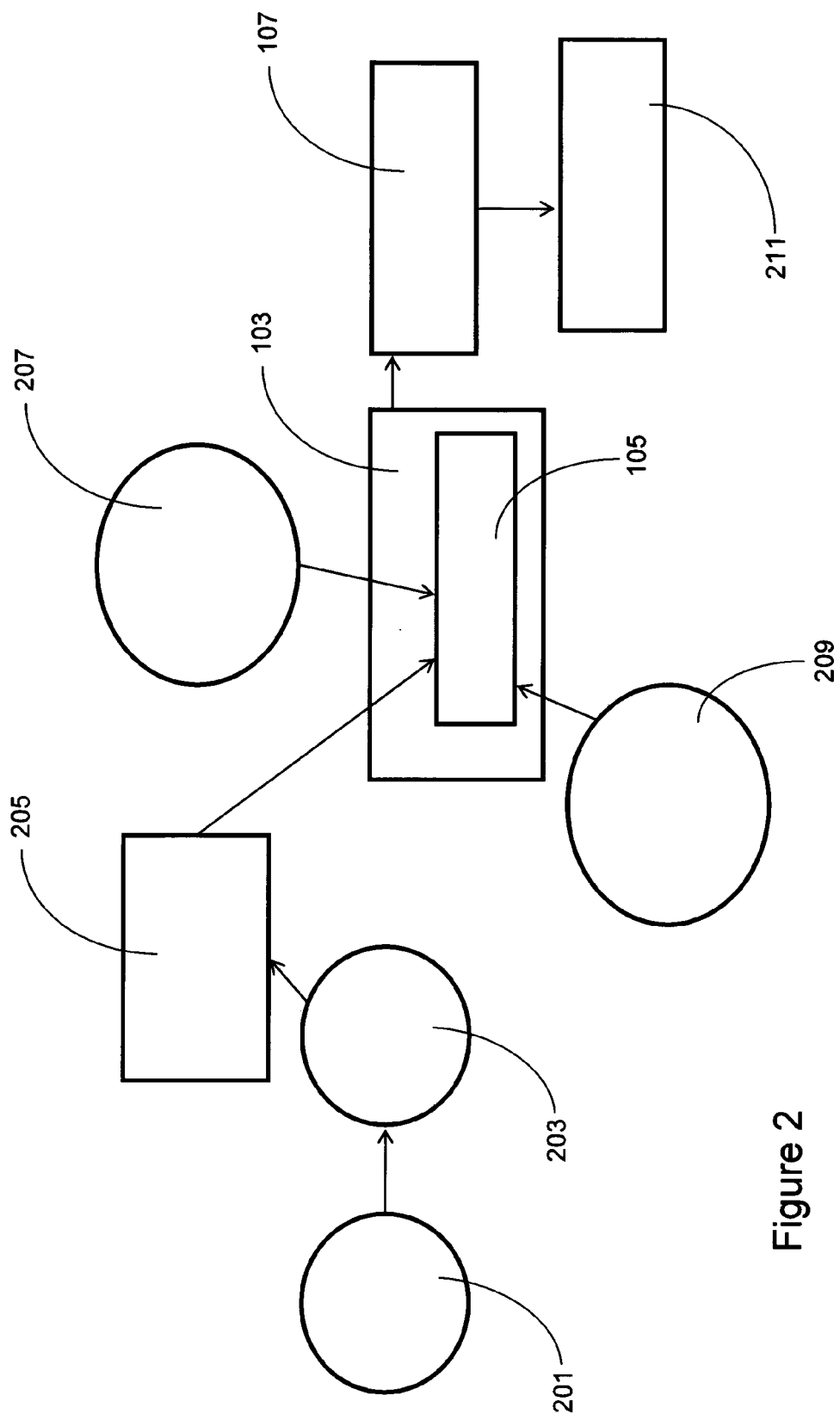
FIG. 2 shows an overview of a training method according to an embodiment of the present invention.

FIG. 2 shows a system block diagram for the training of the various algorithms used by the prediction engine. As explained above, the processing of various applications 201 is monitored by the system and the job features associated with those applications are extracted and provided as job descriptors 203. An algorithm training engine 205 utilises the job descriptors in order to update the algorithm programs within the prediction engine.

The prediction engine also uses application and target cloud features 207 in order to provide job run-time prediction values. Further, user's job history and accuracy of prior predictions 209 may be provided to the prediction engine in order to provide more accurate job time prediction values. Historical data from previous requested job runtime estimations for a particular user, or data taken from the user's profile may be used in order to determine a suitable estimate for job runtime. For example, a particular user may require certain sources within the cloud to be used in order to perform the required job.

The prediction values are passed to the commercial engine and then provided to the user 211.

At the point when a user has requested a prediction, occasionally the application being used by the user may not provide the herein described system (e.g. the commercial engine) with the required characteristics in order for the system to provide accurate run-time estimation for the select job. Therefore, the system utilises an API associated with the application in order to execute the application briefly to obtain a set of characteristics associated with the operation of that application. This pre-processing step creates a number of data points which may then be used by the system to create the required characteristics in order to estimate the run-time for a particular job.

Therefore, in general, the time estimation system includes: a user interface; a plurality of known Job Descriptors containing job parameters and associated job run times $T_{job}$; several prediction algorithms for making predictions $Y_{job}$ for the time the job will take; and an optimization algorithm paired with each such prediction algorithm. Further components may also be incorporated, including but not limited to: job parallelisation, an initial value checking system, a queue time calculation algorithm, and a pricing system.

According to the queue time calculation algorithm feature, when a user requests a job run-time estimation, the parameters provided by the user (whether directly or via the user's computer or an external computer) are monitored by the system in order to determine whether the job is worthwhile running on the cloud.

The queue calculation detects a number of machines in the cloud that are available for the job. The algorithm is a factor of: Cloud server spin up time, Time to load the application on the server, Number of servers already available and spun up, Job prediction time and confidence and Optimal time to process job.

For example, the parameters provided may indicate that it would be quicker and more cost-effective for the user to merely run the job being requested on their own computer.

For example, the parameters provided to the system by the user may be used by the prediction engine and commercial engine alongside the optimisation engine to provide a detected job run-time value. If this value is less than a predetermined value, the system may return a message to the user indicating that it is recommended that they run the application locally or that the system is unable to make an accurate prediction.

Further, the commercial engine also provides to the user a confidence factor value as discussed above. If this confidence factor value captivated by the commercial engine is above a predetermined threshold when compared to the total run-time value than the commercial engine returns a response to the user indicating that it can't predict the estimated run-time and so it is recommended that they manually override the system to run the application themselves. For example, the commercial engine may come back with an estimated run-time of five hours for a particular job, which also includes a confidence factor value of +/−4 hours. This clearly does not provide an accurate estimated run-time when comparing the estimated run-time with the confidence factor value.

The estimation is provided to the commercial engine which, using its splitting and parallelisation rules for said application, will create an estimated time and cost for the job and present this to the user for acceptance.

The optimisation engine is used in conjunction with the commercial engine to determine how the infrastructure within the cloud may be used, i.e. whether it should be used in parallel or singularly to perform certain tasks. Also, it determines which tasks may be separated out for execution by various pieces of the cloud infrastructure.

A number of optimisation algorithms are provided where each optimisation algorithm is paired with a prediction algorithm.

The optimisation engine stores details of cloud infrastructure that is available and may be utilised in order to perform various jobs. The details of the cloud infrastructure used by the optimisation engine are constantly updated taking into account updated machines that become available within the cloud as well as their associated operation times. The optimisation engine is therefore able to determine the most efficient method of utilising the available infrastructure based on this stored information.

In addition, the optimisation engine utilises information associated with availability of, or the time required to start up or use, the available infrastructure. For example, the optimisation engine may utilise the "spinning up" time associated with particular cloud components in order to provide accurate job run-time estimation information to the commercial engine.

The optimisation engine is able to determine whether it is more time and/or cost efficient to split particular jobs between different machines available on the cloud or if it is more time and/or cost efficient to run a particular job on a particular configuration. For example, certain applications may run particularly well on the types of machine configuration available in the cloud.

Figure 3:
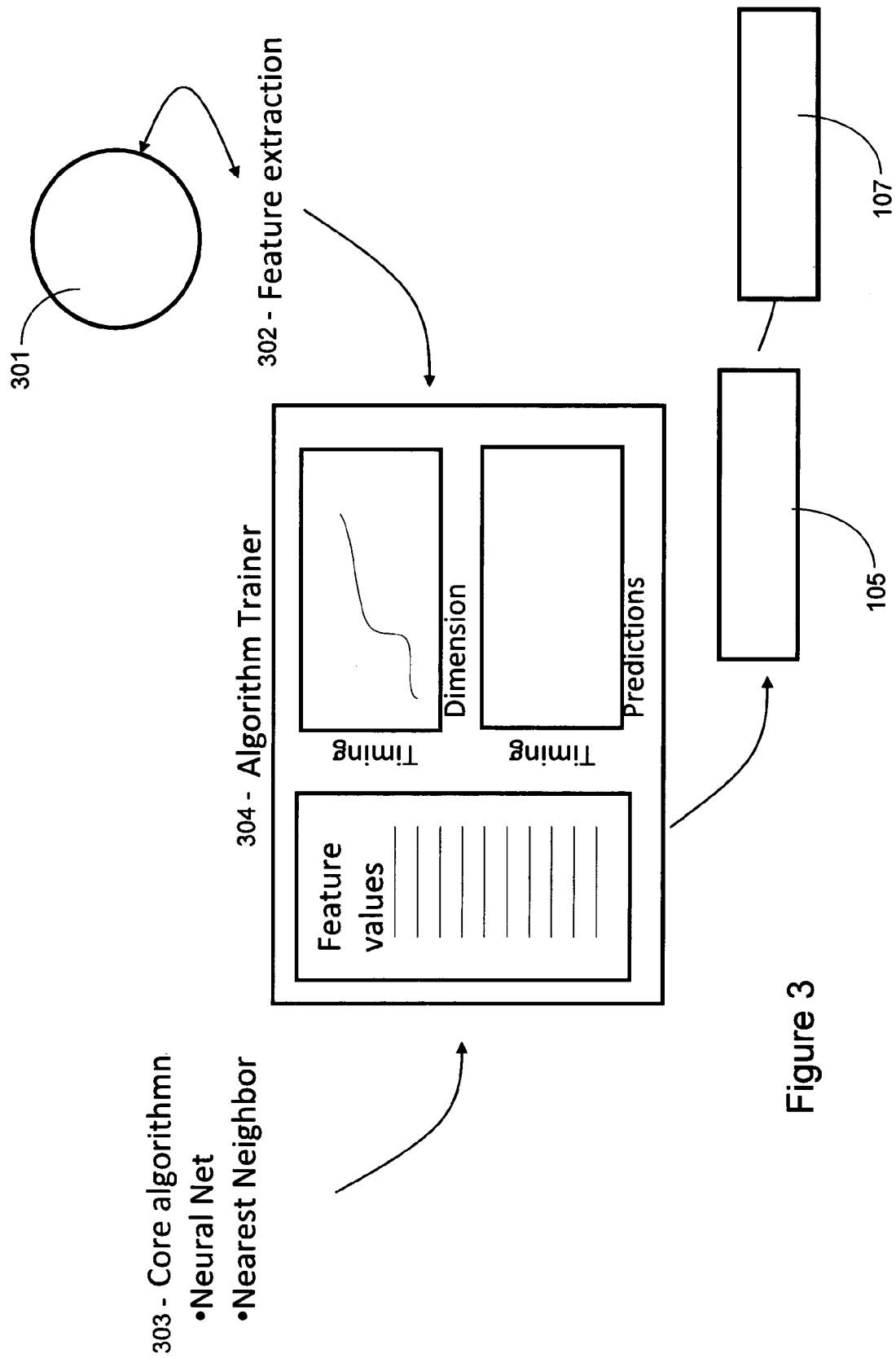
FIG. 3 shows an algorithm trainer according to an embodiment of the present invention.

Utilising this available data, the optimisation engine provides the commercial engine with data associated with the various options associated with the estimated time and cost for performing the job. The training method follows a number of steps as shown in FIG. 3. At step 301 a collection of jobs for analysis are provided. This step is to benchmark the application job processing and generate historic data points of run time and job characteristics or features against a sample of cloud infrastructure configurations.

Step 302: the features are extracted from these jobs. These features are stored as job descriptors.

Step 303: based on characteristics of the distribution of features and job processing times in the historic data, the system determines the most appropriate form of prediction algorithm to use.

Step 304: serialised versions of the algorithms are produced for pre-processing job information into suitable Job Descriptors, and for using these to generate predictions.

Step 5: the serialised version is deployed in the job prediction run time engine to predict job run times when required by the system and provide this to the commercial engine which then passes this information to the user.

Optionally, new historical data for applications may be incorporated and the predictor optimisation step may be redone.

An algorithm is created for use by the prediction engine based on the job descriptors for a specific application. This algorithm is turned into a run time version of the algorithm program. For example, the algorithm may be converted into an XML run time version of the algorithm. As a further example, an executable program, e.g. a .exe program, which is effectively a serialised version of the algorithm, is created.

The serialised algorithm is effectively an "abstraction" of the algorithm which allows the algorithm to be executed on any suitable platform of processing devices within the cloud.

The algorithm program is executed by the prediction engine upon receiving a request from the commercial engine to perform a prediction task. The algorithm program is used to predict the job run-time associated with a specific application on a single instance machine. As explained in more detail herein, this information is provided by the prediction engine to the commercial engine to enable the commercial engine to then provide a user with a number of different options for executing the application in the cloud. For example, the commercial engine may then determine how long it would take to process the job using X number of machines with Y number of processing cores.

It will be understood that the term serialised version of the algorithm describes a version of the algorithm that can be executed on any number of different platforms that are available within the cloud.

The time prediction system is configured to provide a time estimate for a task to be run on a known system configuration within a standard and benchmarked cloud infrastructure platform. The task may be an iterative calculation, for example graphics rendering, Monte Carlo modelling, etc. Typically, the tasks are run on a computer system. In such cases, a task may be characterised by the computer processing required, which may be a combination of number of central processing units used and the time they are used for. This is referred to as the processing time, and is the quantity that the current system is designed to provide an estimate for.

Figure 4:
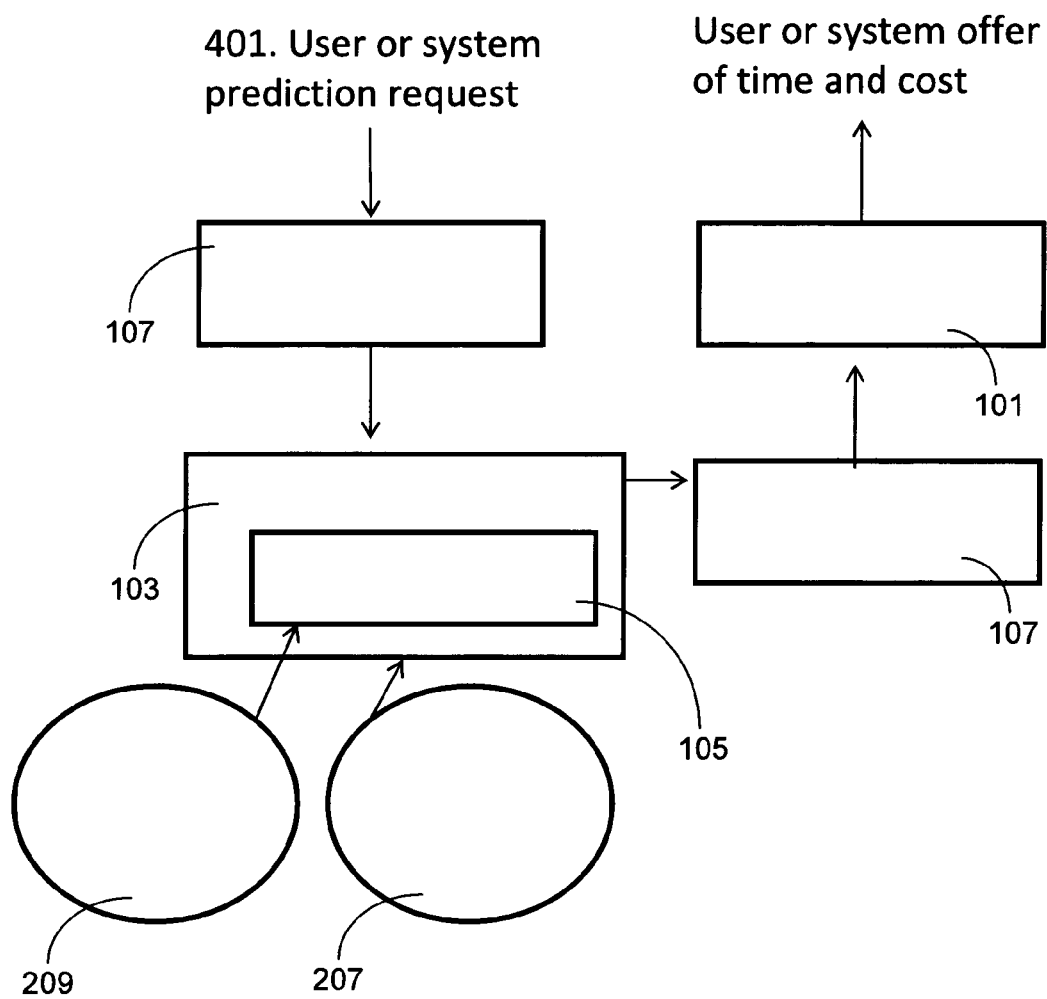
FIG. 4 shows a graphical user interface according to one embodiment of the present invention.
Figure 5:
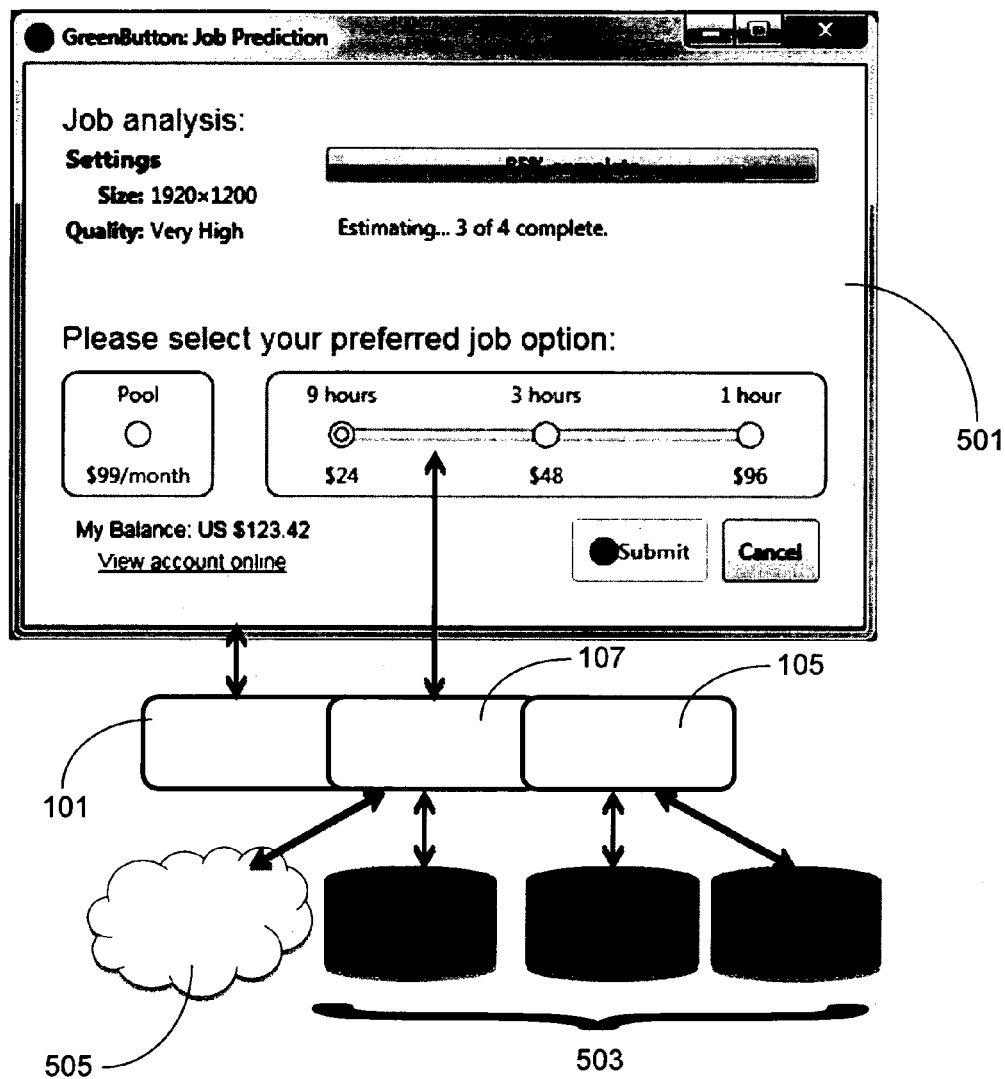
FIG. 5 shows a graphical user interface according to one embodiment of the present invention.

Referring to FIG. 4, a user or system may submit a prediction request to the system at step 401. This request is passed to the commercial engine, which in turn passes the request to the prediction engine. The appropriate algorithm program 105 is utilised to obtain the job run time prediction value as well as a confidence value. The job run-time prediction value and confidence value are provided to the commercial engine 107 which then reports the prediction time and cost to the user or system via the user interface Referring now to FIG. 5, in one embodiment of the invention, the user interface is a form 501 presented on a computer display. The form 501 may be in the form of a web page or a window, however any appropriate form can be used including simple XML which is then passed to another automated management or scheduling system. Various databases 503 are utilised by the commercial engine 107 and the prediction algorithm 105 in order to provide an accurate estimation of the run-time and costs associated with the run-time. The various databases may include user history, parameters associated with the application as well as data taken when monitoring the applications. Further, real time market prices 505 for using various infrastructures in the cloud are obtained.

It will be understood that there may be several different methods by which the user or the user's system can provide data to the time estimation system in order to request an estimated cost for running a particular application in the cloud.

The user may enter specific parameters associated with an application and/or configuration of the system it requires a costing for. These parameters are then sent to the commercial engine. In addition, the commercial engine may retrieve a user's preferences from either collated history data or data available from the user's account. For example, this data may be stored within the cloud.

Alternatively, the user's computer system may perform local analysis of the job which the user requires a costing for. Therefore, the user must choose a particular job within an application to enable the analysis to be performed on the user's computer.

An external system may analyse the job which the user requires a costing for based on job characteristics sent to the external system. Therefore, the user chooses a particular job within an application and the application sends this information to the external system to enable the costing and time estimation to be performed.

Figure 6:
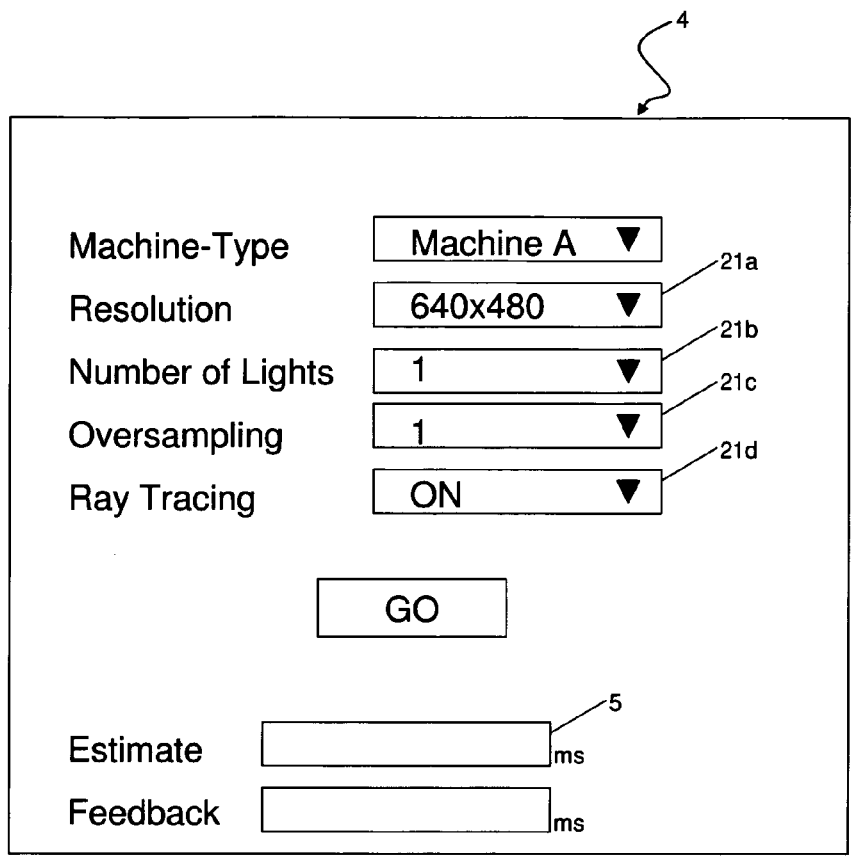
FIG. 6 shows a further graphical user interface according to one embodiment of the present invention.

Referring to FIG. 6, the user interface summarises for a user the input parameters (21a, 21b, 21c, and 21d) gathered by the estimation system based on previous jobs executed on the same type of application as the application and the job the user wishes to run. These input parameters may be characteristics of the application from which the job is being run, characteristics of the target cloud infrastructure, characteristics of the job, the sub components, the subcomponent characteristics of the job and its data.

For example a graphics job may include tasks that have parameters such as resolution 21a, number of lights 21b, oversampling true or false 21c, ray tracing true or false 21d, and/or other parameters. A user initially identifies to the time estimation system the job being run. The time estimation system checks that the application and type of job is known to it, and proceeds to accept input parameter information relating to the job from the application and by examining the job itself and its data.

The user interface described above represents one possible embodiment where a specialised GUI is used as an interface. However, it is envisioned that the user interface may be any one of a variety of options. In one embodiment, the user interface is through an application programming interface (API) which links a particular third party program with the presently described time estimation system. In this case, the user interface may be a GUI, however it may be an automatic system in which the third party program supplies parameter values without further input from the user, or supplies values on selection by the user. In general, any user interface which facilitates the supply of appropriate parameters to the time estimation system may be used.

Examples of the algorithms used to estimate the time for performing a particular job are provided herein.

The algorithm program is used to perform the job run-time estimation task.

According to one embodiment, a user requests a job run-time estimate within a particular application that they are running on their local computer. For example, the request may be made by selecting an appropriate button identified for the purposes of this service. Prior to making the request, the user would have previously selected particular parameters and characteristics associated with running the application, within the application. Upon selecting the appropriate button to make the request an embedded program within the application uploads the selections to the commercial engine.

As an alternative, a local program may operate on the user's computer in order to execute an algorithm program associated with the application. That is, the algorithm program may be stored locally on the user's computer in order to predict a job run-time. The local program may communicate with the commercial engine and/or the optimisation engine in order to provide the estimation of the job run-time as well as the associated cost.

According to this embodiment, the prediction engine runs one of the stored algorithm programs based on the characteristics provided to it by the commercial engine for the requested job. The algorithm program returns values to the commercial engine that are associated with the estimated time for performing the requested job as well as confidence values associated with the estimated time. For example, a specific time value may be provided by the prediction engine to the commercial engine. Along with the specific time value, e.g. three hours, a confidence factor such as + or − a particular time value, e.g. +/−10 minutes, is also provided.

The commercial engine uses this information along with data received from the optimisation engine to provide the user with an optimized time and cost estimation for performing the job as well as, optionally, additional time and cost estimations for performing the job using different configurations or infrastructure that are available on the cloud.

In addition, the information provided to the user on the graphical user interface via the commercial engine allows the user to choose a particular mode of operation for performing the job. That is, the user is not only provided with a single example of a runtime and cost for the select job but is instead provided with various options in order to either increase or decrease the time and/or cost. It is the commercial engine that provides the functionality for allowing the user to choose a job from various options.

This range of costs and run-time information is available to the system due to the analysis carried out when an application is being run using a particular infrastructure within the cloud as discussed in the "gathering data" section above. Further, it will be understood that data may be collected for running an application on various different configurations of the available infrastructure within the cloud. That is, the system may gradually build up an increasing set of data that relates to how an application performs using various different configurations.

That is, data has been gathered by the system due to performing at least one runtime of the job using the application in the available infrastructure in the cloud. Therefore, the commercial engine extracts this information from the stored job descriptors and uses this information to provide an optimized estimation of the job runtime and cost. The optimized estimation of the job runtime and cost is determined in conjunction with the optimisation engine, as described in more detail below.

When the user selects a particular scenario shown on the user interface, the system selects which configuration is to be used in order to provide the estimated run-time. That is, the information used by the optimisation engine and the commercial engine is based on a known configuration within the cloud and that configuration has been used to estimate the run-time for the job.

The following describes the use of the "k Nearest Neighbours" algorithm as a predictor algorithm.

Figure 7:
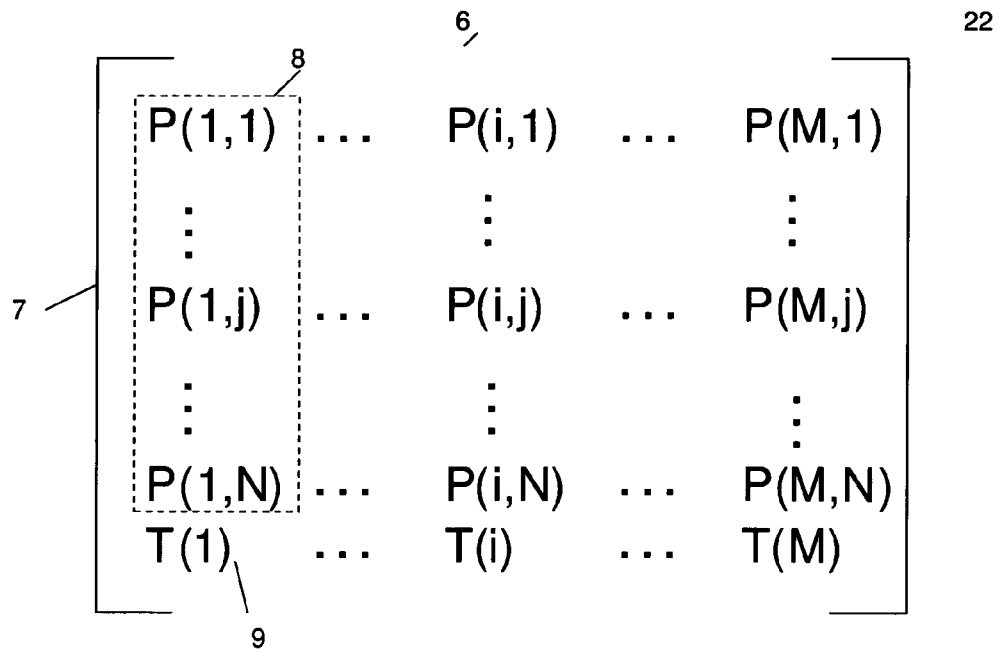
FIG. 7 shows a matrix according to an embodiment of the present invention.

Referring now to FIG. 7, in one embodiment a plurality of unique known vectors 8 describing previous jobs are located in a matrix 22 along with their associated job run times 9. In this embodiment, the matrix consists of columns 6 and rows 7, wherein each column 6 corresponds to a vector 8 (known as a matrix vector) making up all but the last row and the associated job run time 9 in the last row. In this way, a matrix vector 8 may be referred to by its position in the matrix i, and each parameter may be referred to by its position in the matrix j. The matrix 22 is updatable, either by changing a time associated with a matrix vector, or by adding a new unique vector to the matrix. In another embodiment, the job run times are not stored in the same matrix as the matrix vectors. It is understood that the rows of the matrix could correspond to a matrix vector without affecting the system.

Figure 8:
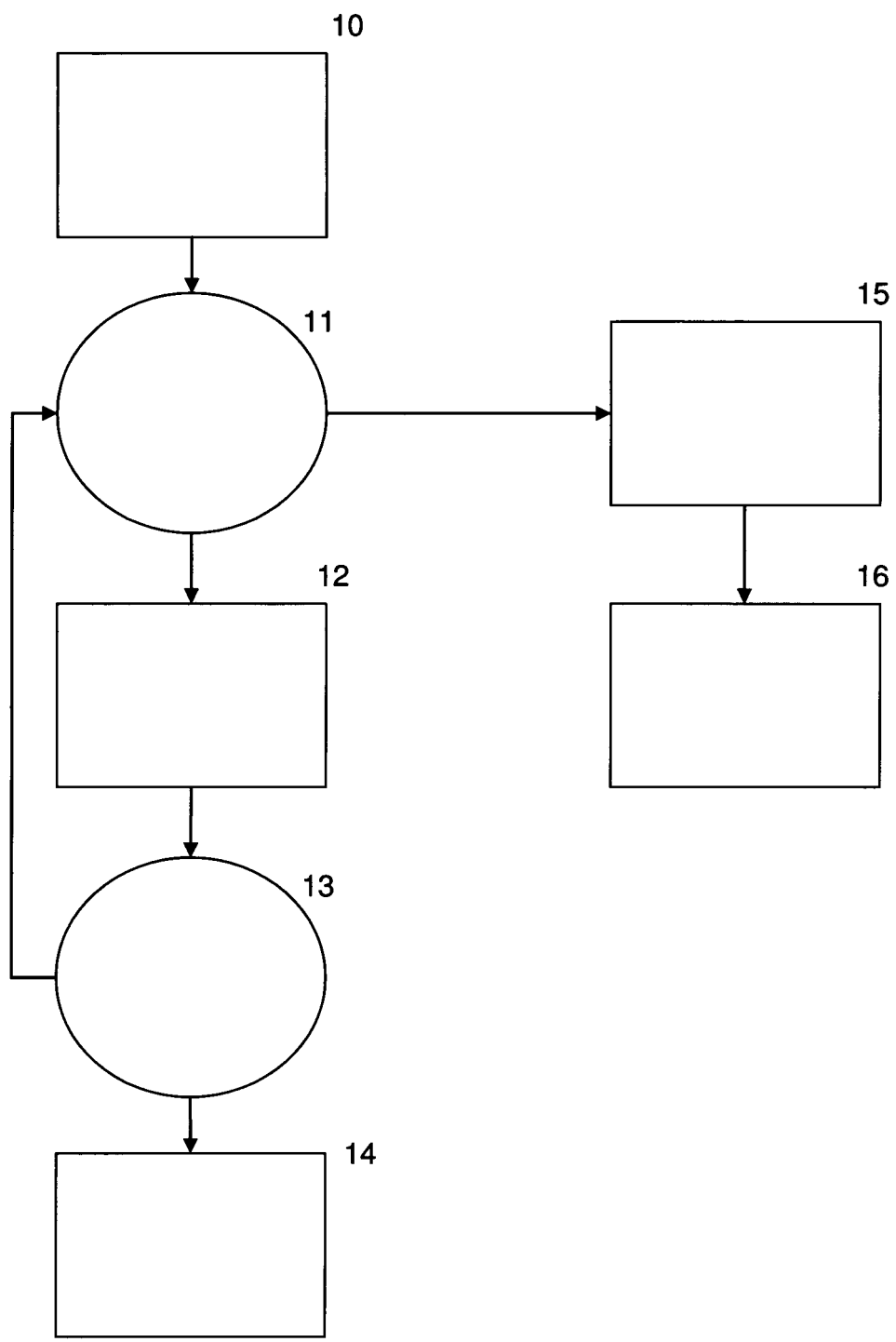
FIG. 8 shows a scoring algorithm according to an embodiment of the present invention.

Referring now to FIG. 8, the system includes a scoring algorithm. The purpose of the scoring algorithm is to identify at least one closest vector from the plurality of unique vectors. One possible scoring algorithm is detailed below, however it is appreciated that there are other possible scoring algorithms possible.

In the present embodiment, the scoring algorithm is split into two components. The initial step is to supply an input vector to the scoring algorithm 10, containing the parameters associated with the job. The first component compares the input vector to each matrix vector to determine if there is a matrix vector with identical parameters to the input vector 11. Since the matrix contains only unique vectors, there can only be at most one matrix vector with identical parameters to the input vector. If a matrix vector is identified as being identical to the input vector, then the time value of the matrix vector is selected as the job run time estimate 15. In this case, the estimation algorithm is bypassed 16.

In the case where there is not an exact match between the input vector and any of the matrix vectors, the scoring algorithm is configured to determine one closest vector 11, 12, 13. The scoring algorithm produces a score for each matrix vector in the matrix, where the score is indicative of the closeness of the matrix vector to the input vector. The score is based on how similar the matrix vector is to the input vector, with higher scores indicating a closer match.

There may be one or more different types of parameter. In the present embodiment, three possible parameter types are anticipated. These are: binary parameters consisting of a "true" or "false" state; integer parameters; and enumerate parameters which consist of parameters that must be converted into an integer parameter by the scoring algorithm. Enumerate parameters by themselves are typically not suitable to ordering or using in equations. In general, there is some way to enumerate the parameter such that a number can be associated with it. For example, in animation, resolution is typically gives as two numbers (i.e. 2048×1024), and the enumerated value would be the multiplication of these two numbers (i.e. 2048×1024=2097152). Whenever the following discussion refers to the value of a parameter, it is assumed that the value is the enumerated value based on the enumeration algorithm.

Examples of each parameter are summarised in the following table for the case of a computer animation job.

| Parameter Type | Property | Example Value | Example as number |
| --- | --- | --- | --- |
| Binary | Over-sampling | True | 1 |
| Integer | No. of lights | 22 | 22 |
| Enumerate | Resolution | 2048 × 1024 | 2097152 |

For each parameter in the matrix vector, q, a parameter score is calculated. The first step in calculating the parameter score is to identify which parameter type the parameter is.

In the current embodiment, the following methods are used to score the parameters, however it is appreciated that other scoring systems could be used.

For binary parameters, the parameter score is 1 if the parameters are identical, and 0 if the parameters are different.

For integer parameters, the parameter score is defined by the following equation:

$$\text{parameter score} = 1 - \left(\frac{|p-q|}{R}\right)$$

Here, p is the input parameter value and q is the matrix vector parameter value. R is the range of the dimension, and is equal to the largest integer value possible minus the smallest integer value possible. This will give a parameter score of 1 if the matrix parameter is equal to the input parameter, a score of 0 if they are completely different, and a score between 0 and 1 otherwise.

For enumerate parameters, the parameter score is based on the distance between the matrix vector parameter and the input parameter in the matrix. This is a more complicated analysis as there may be matrix parameters identical to one another, and there may not be any matrix parameters identical to the input parameter. In the present embodiment, these issues are solved by following the following steps:

1. All the matrix vector parameters relating to the enumerate parameter are extracted into a scoring vector and enumerated
2. The scoring vector is ordered from lowest value to highest value
3. Where there a multiple equal entries in the scoring vector, entries after the first are removed
4. If there is no entry value in the scoring vector equivalent to the input parameter value, then a new entry is appended to the vector containing the input vector value and the vector is reordered from smallest entry to largest After following the above steps, there should be a vector of known size containing every enumerated parameter value known to the system, and possibly an extra entry containing the input vector parameter value. To score the matrix vector parameter, the index of the equivalent value in the scoring vector to the matrix vector parameter is found (q.index), the index of the equivalent value in the scoring vector to the input vector parameter is found, and the size of the scoring vector is found (R). The following equation then applies:

$$\text{parameter score} = 1 - \left(\frac{|p.\text{index} - q.\text{index}|}{R}\right)$$

This gives a score of 1 if the matrix vector parameter is equivalent to the input vector parameter, and a value of less than 1 if they are dissimilar.

Once each parameter in a matrix vector has been given a parameter score, the score for the matrix vector can be worked out. In the present embodiment, this is simply done by adding the scores for each parameter together. However, it is envisioned that many other possibilities for determining the matrix vector score are possible. For example, it may be desirable to include weighting so that some parameters score higher than others due to increased real or perceived importance.

The scoring algorithm is applied separately to each matrix vector in the matrix, and the highest scoring matrix vector is selected as the closest vector 14. If two or more matrix vectors have the highest score, then a tie-breaker may be employed. One example of a tie breaker is simply choosing the matrix vector closest to the beginning of the matrix. Any potential tie breaker may be used which is able to select one matrix vector from a plurality of highest scoring matrix vectors.

Figure 9:
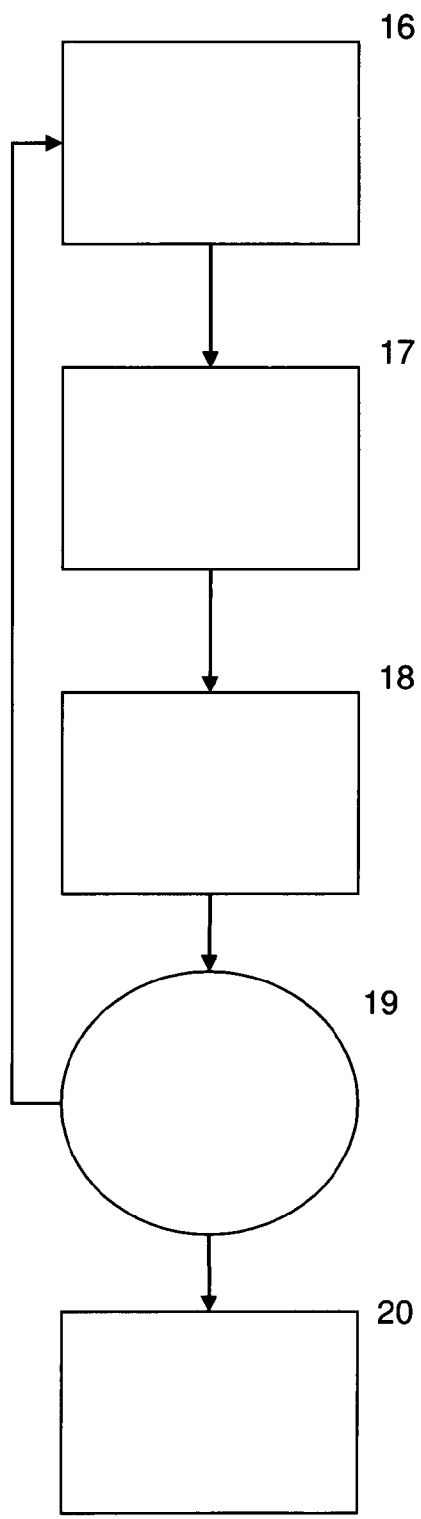
FIG. 9 shows an estimation algorithm according to an embodiment of the present invention.

Referring now to FIG. 9, the system includes an estimation algorithm. The purpose of the estimation algorithm is to calculate an estimated job run time when there is no matrix vector identical to the input vector. The estimation algorithm uses the time value associated with the closest vector as a base time to calculate the time estimation. The estimation algorithm also finds at least one other vector for each parameter in the input vector not identical to the associated parameter in the closest vector to assist with calculating the estimated job run time.

In one embodiment, one other vector is found for each non-identical parameter in the closest vector 17. Each other vector is found by comparing the non-identical parameter in the closest vector to the associated parameters in each of the remaining matrix vectors. The matrix vector with the parameter closest in value to the non-identical parameter is selected as being the other vector for the particular non-identical parameter. There may be further criteria placed on the potential third vector. In one embodiment, the associated parameter value in the third vector must be smaller than the non-identical parameter value. If there are more than one matrix vectors with associated parameter values closest to the non-identical parameter value, then the matrix vector with the highest score from the scoring step is selected. In the case where there is still more than one possible matrix vector, a further tie-breaking step is required. One possible tie-breaking step is selecting the matrix vector closest to the beginning of the matrix. However, it is appreciated that other tie-breaking steps possible.

In one embodiment, the one or more other vectors are required to be within a certain similarity of the closest vector. One option may be to only consider matrix vectors which are identical to the closest vector over all parameters except the non-identical parameter being analysed. This would limit the choice of other vectors to ones which are almost the same as the closest vector. Another option would be to require the other vectors to be scored in a similar way to that described above for the scoring algorithm, but with respect to the closest vector. The possible other vectors could then be limited to those scoring at least a preconfigured amount (for example, 90%) when compared to the closest vector.

It is appreciated that in other embodiments, more than one other vector may be found. In general, it is expected that the other vectors for each non-identical parameter should contain associated parameter values relatively close to the non-identical parameter value.

After selection of the one or more other vectors, the estimated job run time may be calculated based on the non-identical parameter value in the closest vector and the one or more other parameter values from the one or more other vectors. In general, interpolation techniques 18 are used to interpolate the estimated job run time from the base time associated with the closest vector.

In one embodiment, where only one other vector is found for each parameter, linear fitting 18 is used to provide an estimated change in the estimate for the time required from the base time required to complete the Job. For each non-identical parameter, a change in time value is calculated by taking the closest vector parameter value ($q_1$) and an associated timing value ($t_1$), the other vector parameter value ($q_2$) and associated time value ($t_2$), and the input vector parameter value (p). With these numbers known, the estimated change in time for each non-identical parameter can be calculated as follows:

$$\text{change in time} = \left(\frac{t_1 - t_2}{q_1 - q_2}\right)(p - q_1)$$

In another embodiment, where more than one other vector is obtained, interpolation 18 may be of a curve fitting type.

For example, if the time increase due to a parameter change is known to not be linear, then a non-linear curve may be used to estimate the time change. The result of the interpolation should still be an estimated change in time for each non-identical parameter.

Once an estimated change in time is found for each parameter, these may be combined with the base time to get an estimated job run time 19. In one embodiment, each estimated change in time associated with each non-identical parameter is added to the base time to give an estimated job run time. The estimated job run time is then presented to the user 20.

Referring back to FIG. 2, depending on the system that the user is using, the estimated job run time may be presented in different ways 5. In general, the estimated job run time is presented using the user's computer system. This may include text, for example a command line, graphics, for example a chart, a graphical user interface, for example a window or display box. Other, non visual methods may also be used.

As discussed previously, a job descriptor's set of data may include the following information.

A set of discrete tasks associated with a particular job. In the case of an animation application, for example, the set of discrete tasks may be the set of individual frames that are required to be rendered within the animation. That is, each frame is a single task.

A fixed number of context parameter values are also defined. The context parameter values are stored as a vector holding several parameters. The parameter values may be associated with a number of different characteristics associated with the job. For example, in an animation application, this may be a characteristic that defines a blur operator or any other functions that are applied across the whole job.

Therefore, for each application there will be a fixed number of context parameter values associated with the application. These effectively define how the application is to execute the job, i.e. job process parameters. That is, the context parameter values are on overall descriptor of the job at the top hierarchical level, or in other words, they summarise the whole job.

Subcomponents of the discrete tasks may also be identified within the job descriptor information by the sub components characteristics. For example, each discrete task is broken down into subcomponents to identify particular components within each task. Each of these subcomponents has a number of characteristics associated with it. Although the number of subcomponents present within a particular job may vary, the number of characteristics associated with a subcomponent is usually fixed for any particular application. Therefore, each sub component of a task has a fixed number of characteristics associated with it. These characteristics, or parameters, define the sub component. For example, in an animation application, a characteristic of a subcomponent (i.e. an element within a frame) may be defined by the "materials" within the animation (i.e. the material that the object within the animation is made out), the blur factor associated with the element, and any other parameters associated with the element.

Repeat parameters are determined in order to accurately predict the run-time required to execute the job. For example, in an animation, if a particular feature is required to be rendered five times it will be understood that the time estimation program is only required to estimate the time taken to render this feature once, all else being equal. When the time estimation program detects the same feature again it understands that it has already determined the estimated time to render that feature and so is not required to make a further estimation.

That is, if there are multiple identical processes then only the time required to execute a single process is to be added to the run-time calculation.

The actual time and predicted time for a particular job are also stored alongside the job descriptors. The actual time is a previously measured time for performing the job using the defined job descriptors. The predicted time is a job time that has previously been predicted by the prediction engine.

A Job descriptor includes a number of parameters that define a particular job. The job descriptor parameters are:
  collected during training for use in the run-time calculation. That is, real world data is collected from the cloud through passive monitoring.
  collected during specific training of a specific application.
  used in the run-time calculation to calculate the estimated run-time. That is, the existing job descriptors are used by the algorithms in the prediction engine to predict the time required to perform a requested job.
  based on information provided by the user to enable the run-time calculation.

Further, new job descriptors are created based on information received from the user (whether directly or indirectly) for the purposes of predicting the time required to perform a requested job. The new job descriptors are associated with the job request.

The job descriptors may be stored in the cloud after being collected from the user's computer. Alternatively, the job descriptors may be stored locally on the user's computer.

Therefore, a "Job descriptor" for an application collects summary descriptions of the various aspects of a Job that are deemed relevant to the assessment of how long the Job will take to run. An example of a Job descriptor may therefore consist of
  an integer #Segments$_{job}$ specifying the number of Tasks in the Job, such as the number of frames in an animation. That is, a job to be processed by an application can be separated into a number of discrete tasks;
  a fixed number of Context parameter values (a vector);
  a subcomponent's characteristics associated with subcomponents of discrete tasks within the job. The subcomponent characteristics include a fixed number of parameter values describing each subcomponent, i.e. identifying the subcomponent characteristics (a vector). That is, the parameter values define the type of subcomponent;
  a set of PresencePerTask parameters, (henceforth PPS$_m$), one for each subcomponent, indexed by the subscript m. That is, the term PPS is understood to mean the average over all Tasks of the degree to which a particular subcomponent is present within that Task.
  a record of the actual time taken to complete this job, T$_{job}$, if this is known.
  a prediction Y$_{job}$ for the time taken to complete this job, if this has been calculated.

The number of subcomponent parameters is not necessarily the same for all Jobs, but is always at least one. A Training Set consists of a corpus of Job Descriptions for jobs that have been run to completion in the past, for which the actual timings T$_{job}$ are known.

The predicted timing for a Job represented in this way is given in Equation 1.

$$Y_{job} = \text{\# Segments}_{job} \sum_{m \in \{Characteristic of subcompoents in\ job\}} PPS_m y(x_m, w). \quad \text{Equation 1}$$

where:
- m is an index used to identify each of the subcomponent parameters in the Job.
- $x_m$ is the vector formed by concatenating the Context vector of the Job with the subcomponent parameter vector for the $m^{th}$ subcomponent parameter contained in the Job;
- $y(x_m, w)$ is the output of a function approximator that is given a vector $x_m$ as input, produces a scalar as output, and has its own set of parameters, denoted w;

As an example, the function approximator that generates $y(x_m, w)$ could be a standard neural network, consisting of a single output unit that is linear (that is, generates an output that is a linear weighted sum of its inputs) and receives input from a single layer of hidden units that are generate their outputs by evaluating the logistic function $1/(1+e^{-z})$ on z, where z is a weighted sum of the inputs $x_m$. The weightings referred to here can be collected as a single vector of weights w, which are the parameters of the neural network. $w_i$ refers to the $i^{th}$ component of this vector.

As an application example, the Blender software application produces rendering jobs in the form of files containing very rich primary descriptions of objects and lighting in a computer generated scene, to be rendered by ray-tracing algorithms that are computationally demanding to implement. The rich primary description is not suitable for direct use in making predictions and so it is pre-processed to extract a Job Descriptor as described above. In the case of Blender, the characteristics (i.e. sub component parameters) of the elements within a frame (i.e. Task) are known as materials. For example, any object within a frame will have one or more characteristics associated with it, such as the material it is modelled as being made from, such as glass, wood, fur etc. Therefore, each subcomponent is associated with a particular characteristic, or in other words, each subcomponent is defined as a particular type based on characteristics. The number of subcomponents may vary for a particular task, but each subcomponent will have a fixed number of characteristics or descriptive parameters.

In this example, the prediction algorithm uses a neural network, and begins by setting a counter to zero. For each subcomponent in turn, a vector $x_m$ is generated and presented to the network's input layer. As a result of this input, together with the network's parameters w, the network produces an output $y(x_m, w)$, which is multiplied by the corresponding $PPS_m$ and added to the counter. Once all the subcomponent parameters have been processed in this way, the counter is multiplied by the number of Tasks in the job (in Blender, Tasks correspond to frames).

The parameters w can be set so as to give predictions for $Y_{job}$ that optimize a criterion C chosen such that it penalizes predictions that are incorrect on a Training Set, and also penalizes some values of w that are considered unreasonable (for example, those with very large absolute values):

$$C = \sum_{\substack{jobs\ in\\ Training\ Set}} C_{job} + C_w \qquad \text{Equation 2}$$

An example choice for $C_{job}$ is $$C_{job} = \frac{1}{2}(T_{job} - Y_{job})^2$$

and an example choice for $C_w$ is $$C_w = \frac{\beta}{2}\sum_i w_i^2$$

where $\beta$ is a positive constant. Other choices are possible and may be more reasonable in different circumstances (for example, it may be preferable to make predictions for the logarithm of $T_{job}$ instead of $T_{job}$ directly).

Provided $C_{job}$ is differentiable with respect to prediction $Y_{job}$, and because $Y_{job}$ (Equation 1) is differentiable with respect to parameters w, the partial derivative of C with respect to the $i^{th}$ component of w can be evaluated as in Equation 3:

$$\frac{\partial C}{\partial w_i} = \sum_{\substack{jobs\ in\\ Training\ Set}} \frac{\partial C_{job}}{\partial w_i} + \frac{\partial C_w}{\partial w_i} \qquad \text{Equation 3}$$

$$= \sum_{\substack{jobs\ in\\ Training\ Set}} \frac{\partial C_{job}}{\partial Y_{job}} \frac{\partial Y_{job}}{\partial y(x_m, w)} \frac{\partial y(x_m, w)}{\partial w_i} + \frac{\partial C_w}{\partial w_i}$$

By substituting suitable choices for $C_{job}$ and $C_w$ and by using Equation 1 for $Y_{job}$, the gradient given by Equation 3 can be used as part of an algorithm to optimize the overall criterion C by iteratively improving upon initial values for parameters w.

Several different forms of algorithm may be used for the general case, including naïve hill-climbing (called "Back-propagation" in the context of neural networks), and the conjugate-gradient method. What is distinctive here is the particular choice for the prediction given by Equation 1, the gradient of which appears as the second partial derivative term in Equation 3. Notably, target outputs for the overall prediction are available for items in the training set, but targets are not available for the outputs $y(x_m, w)$ of the function approximator. Therefore, the system adapts the use of the gradient produced by Equation 1 to train the function approximator even without "output targets".

Therefore, the variable parameters within the equations discussed above are adjusted during the training stage to tune the algorithm. That is, according to this particular example, the gradient of the rate of change of cost of using the current weights is used to optimise the function.

In general terms, the prediction algorithm uses parameters (such as weighting factors) in order to execute the prediction algorithm. These parameters are set based on all previous jobs used to train the algorithm. A sum of errors (or similar cost function) is calculated by summing over the costs of prediction errors for the historical jobs. This sum of errors is the cost of using the current parameters, so the optimization algorithm searches for values that lead to lower costs. The gradient of the cost function is useful in that it makes this search process much more efficient than it would be without knowledge of the gradient. The back-propagation and conjugate gradient algorithms both use this gradient information.

The gradient is determined indicating the rate of change of the cost of using the current weights as the weight values used in the neural network are modified. That is, a local approximation is made as to whether the cost of using the current weights goes up or down depending on the change in the weight values. By predicting what will happen with the use of the current weights, an estimation of what will happen with the modified rates can be understood. Therefore, it is possible to modify the weight values based on the gradient. Alternatively, the weight values may be modified based on a trial and error method, or any other suitable training algorithm, although such methods tend to be much less efficient.

It will be understood, that where the neural network algorithm is applied to an application that has a sub component having a single parameter or characteristic, the algorithm reverts to a standard neural network algorithm.

As explained above, the prediction $Y_{job}$ is generated by learning parameters using a Training Set of examples run on a particular platform/cloud scenario. However, predictions can be made for run times on different platforms provided overall conversion factors are taken into account. For example, the system can convert from a prediction $Y_{job}^A$ for the time taken under platform A to a prediction for a second platform B using $$Y_{job}^B = (Y_{job}^A - S^A)\frac{R^B}{R^B} + S^B$$

where $S^X$ denotes the initial start-up time required to begin a job on platform X, and $R^X$ is a measure proportional to the average speed of ongoing processing on platform X. This form assumes linearity in the conversion between the two platforms, but non-linear forms could also be given based on knowledge of particular platform characteristics. That is, an extrapolation may be made of a prediction in order to take into account variations on another platform.

In one embodiment, once the user has been informed of the estimated job run time, they are given the option to proceed with the job taking into account the estimated job run time, or decline proceeding with the job. If the user declines the job, then the user may have the option of adjusting one or more parameters and re-running the job run time estimation system. For example, if the job is a computer animation job, the user may opt to decrease the resolution of the animation to reduce the job run time.

In one embodiment, the estimated job run time is modified based on the estimated time until the job may begin. This may be pertinent when other jobs are being run on the system, and there are no spare processors currently available to begin the job on, and/or there are other jobs queued to run on the system. The estimated time until the job can begin may be calculated based in part of estimated job run times of currently running jobs on the system and in a queue to run on the system. In a particular case of this embodiment, the user may select a queue priority for their job. It may be that high priority is guaranteed a closer start time at an increased cost.

In one embodiment, a user that has run jobs on the system previously may be known to the system. For example, the user may require a logon to use the system. Historical data from previous user jobs may be used to modify the estimated job run time. For example, if a user is known to produce animations of a certain style, where that style has an effect on the job run time, this data may be incorporated into the estimated job run time.

In one embodiment, the job run time estimation includes a confidence interval value. In this embodiment, the estimated job run time is given as a range. The user selects a confidence level, where the system indicates a certain confidence that the job run time will be within the range of the estimated job run time. For example, the system may be 95% sure that the job run time will be within the presented estimated job run time range. The estimated job run time range will in part be based on the estimated job run time previously calculated. The range may be based on historical run time data and/or known information about the task being run. For example, it may be known that animation jobs from a particular program are in general faster or slower than generic animation jobs.

In one embodiment, the system includes a method to review past history of the user and variance between estimated time and actual for a given application. In the case of a known linear variance the system will amend the prediction by this factor to improve the confidence level of the estimation.

In one embodiment, the system includes an optimization model where for a given application and cloud infrastructure platform the optimized parallelisation of the job is determined based on the number of tasks and splitting of those tasks to run on a variable number of infrastructure instances. The optimization model produces for the commercial engine this optimal infrastructure to be allocated to the job.

In one embodiment, the system includes a commercial model engine where for a given infrastructure to be allocated to the job, the system will determine the actual time to complete the job based on the parallelisation.

In one embodiment, the system includes a commercial model engine configured to receive the estimated job run time along with the given infrastructure and volume and produce an estimated monetary cost associated with the estimated job run time. This monetary cost is typically based on the processing time of the job, and may also include the number of central processing units that the user wishes the job to be run on. The estimated monetary cost may be presented to the user along with the estimated job run time, and any further decisions and changes made by the user may be used to update the estimated monetary cost. In a further embodiment, the user is given the option of decreasing the job time by increasing the cost. The job time may be decreased by prioritising the job over other jobs that may already be in a job queue or running.

If a user decides to proceed with the job, then the resulting job run time may be used to update the system. In general, it is a requirement that the job completes without errors, and that the job time is not an outlier. For example, in an animation job, if the "camera" is pointing in the wrong direction, then the job may complete in an unusually fast time. This may not necessarily show errors but would provide a statistical anomaly, and should therefore be excluded from updating the system.

In one embodiment, there are two ways in which the matrix may be updated with the job run time. In the situation where there is already a matrix vector in the matrix identical to the input vector, then the measured run time may be averaged with the current run time associated with the matrix vector to provide a better time estimate to further estimates. In one embodiment, a confidence measure, for example standard deviation, which may be associated with the run time, may also be updated.

For example, referring to FIG. 10, a matrix with M matrix vectors may be expanded in size to N+1 matrix vectors, where the N+1 vector is the new matrix vector. The other dimension of the matrix does not change in size.

In the situation where there is no matrix vector with identical parameters to the input vector, then the input vector may be added to the matrix forming a new matrix vector in a known way, for example by appending the vector to the matrix. The measured run time is also added to the matrix such that the new matrix vector is associated with the measured run time.

For example, referring to FIG. 11, the matrix vector at the horizontal position i has the new time information $t_{new}$ added to the current time information $t_i$, and this total is divided by two to average the result.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

It will be understood that, when referring to the user of the system, the user may be a person operating a local computer. Alternatively, the user may be the computer itself. For example, the computer may automatically communicate with the herein described system as well as automatically access particular applications using a suitable API.

The invention claimed is:

1. A method, implemented at a computer system that includes one or more processors, for estimating a processing time for a data processing job to be run on a data processing device:
   creating an input array containing one or more parameters;
   using a scoring algorithm to obtain a closest neighboring array by comparing the input array to a plurality of known arrays;
   for at least one parameter of the input array, using the closest neighboring array and at least one other neighboring array to determine a variation in estimated processing time, wherein the at least one other neighboring array is selected from the plurality of known arrays excluding the known array selected as the closest neighboring array, and wherein at least one other neighboring array is found for each parameter in the input array that is not identical to an associated parameter in the closest neighboring array; and
   providing a processing time estimate that is a combination of the processing time of a closest neighboring array and the variation in estimated processing time.

2. A method as claimed in claim 1, wherein each known array has an associated known processing time.

3. A method as claimed in claim 2, wherein each known array includes the associated known processing time as part of the array.

4. A method as claimed in claim 1, wherein the input array is a vector.

5. A method as claimed in claim 1, wherein the closest neighboring array is a vector.

6. A method as claimed in claim 1, wherein the one or more other arrays are vectors.

7. A method as claimed in claim 1, wherein an associated known processing time is associated with each known array.

8. A method as claimed in claim 7, wherein the associated known processing time associated with each known array is stored as a parameter value within the known array.

9. A method as claimed in claim 1, wherein the known arrays are stored in a single array.

10. A method as claimed in claim 9, wherein the known arrays are stored as a matrix.

11. A method as claimed in claim 10, wherein the known arrays are represented by either the columns or the rows of the matrix.

12. A method as claimed in claim 9, wherein known arrays are added to the single array as processing times are determined.

13. A method as claimed in claim 2, wherein the associated known processing time of a known array is updated.

14. A method as claimed in claim 13, wherein the associated known processing time is updated by averaging the old associated known processing time with a new time.

15. A method as claimed in claim 1, wherein each parameter is one of: binary, integer, or calculated.

16. A method as claimed in claim 1, wherein the input array is created at least in part by a user.

17. A method as claimed in claim 16, wherein a user selects parameters to create the input array using a graphical user interface.

18. A method as claimed in claim 16, wherein a user selects parameters to create the input array using a command line.

19. A method as claimed in claim 16, wherein a user selects parameters to create the input array using one or more of a plugin or an extension for a third party program.

20. A method as claimed in claim 1, wherein the input array is created at least in part by an application programming interface.

21. A method as claimed in claim 1, wherein the scoring algorithm produces a score for each known array.

22. A method as claimed in claim 1, wherein the scoring algorithm excludes at least one known array from being scored based on preset criteria.

23. A method as claimed in claim 21, wherein each score is based on comparison between each corresponding parameter in the input array and the known array.

24. A method as claimed in claim 23, wherein each parameter has an associated scaling factor such that the importance of the parameter to a final score is represented by the associated scaling factor.

25. A method as claimed in claim 21, wherein the score for each known array is proportional to the closeness between the known array and the input array.

26. A method as claimed in claim 21, wherein a higher score corresponds to a higher closeness between the input array and the known array.

27. A method as claimed in claim 26, wherein the highest scoring known array is selected as the closest neighboring array.

28. A method as claimed in claim 26, wherein some of the known arrays are excluded from being selected as the closest neighboring array, and the highest scoring non-excluded known array is selected as the closest neighboring array.

29. A method as claimed in claim 28, wherein known arrays with binary parameters not identical to the corresponding parameters in the input array are excluded from being selected as the closest neighboring array.

30. A method as claimed in claim 28, wherein only known arrays with a score within or greater than a predetermined range may be selected as the closest neighboring vector.

31. A method as claimed in claim 1, wherein each other neighboring array is found by finding a known array with an associated parameter value closest to the associated parameter value of the closest neighboring array.

32. A method as claimed in claim 31, wherein only known arrays with associated parameter values less than the associated parameter value of the closest neighboring array are considered when determining each other neighboring array.

33. A method as claimed in claim 1, wherein an associated known processing time of the closest neighboring vector and an associated known processing time of the other neighboring vector are used to calculate a variation in estimated processing time.

34. A method as claimed in claim 33, wherein the variation in estimated processing time is calculated at least in part by performing a linear fit between the two times.

35. A method as claimed in claim 1, wherein more than one other neighboring array is found for each parameter in the input array that is not identical to the associated parameter in the closest neighboring array, wherein each other neighboring array includes an associated known processing time, and wherein a curve fitting algorithm is used to calculate the variation in estimated processing time.

36. A method as claimed in claim 1, wherein extrapolation is used to determine the variation in estimated processing time.

37. A method as claimed in claim 1, wherein interpolation is used to determine the variation is in estimated processing time.

38. A method as claimed in claim 1, wherein the processing time estimate is the sum of the associated known processing time of the closest neighboring array and the at least one variation in estimated processing time.

39. A method as claimed in claim 1, wherein the processing time estimate is presented to a user.

40. A method as claimed in claim 39, wherein the presentation is achieved using a graphical user interface.

41. A method as claimed in claim 1, wherein the processing time estimate includes a confidence measurement.

42. A method as claimed in claim 1, wherein the processing time is the product of the number of processors that the data processing job is being run on and the total time the job runs for.

43. A method as claimed in claim 1, wherein historical user data is used to adjust the processing time estimate.

44. A method as claimed in claim 1, wherein the processing time estimate includes an estimate of the time until the job will begin.

45. A method as claimed in claim 44, wherein the estimate of the time until the job will begin is at least in part based on the processing time estimates previously made for currently running and queued jobs.

46. A method as claimed in claim 1, wherein the processing time estimate includes a cost estimate at least in part based on the processing time estimate.

47. A method as claimed in claim 1, further comprising:
providing the processing time estimate to a user; and
prompting the user to accept or decline the data processing job based at least in part on the processing time estimate.

48. A method as claimed in claim 47, wherein the user is given the option to adjust one or more of the parameters in the input array if the user declines the data processing job.

49. A method as claimed in claim 47, wherein the user may be prompted to select a shorter processing time in exchange for an increase in cost.

50. A method as claimed in claim 1, wherein the one or more parameters include one or more of the availability of processing devices within the distributed processing system, the start up time of processing devices within the distributed processing system, and historical run time data for the processing devices.

51. A method as claimed in claim 1, wherein the one or more parameters comprise one or more first parameters, the method further comprising:
modifying the processing time estimate based on one ore more second parameters associated with one or more other data processing devices, and based on determining optimal parallelization of the data processing job, and wherein the optimal parallelization involves the splitting or clustering of the data processing job.

52. A computer program product comprising one or more hardware storage devices having stored thereon computer-executable instructions that, when executed at one or more processors of a computer system, cause the computer system to estimate a processing time for a data processing job to be run on a data processing device, including at least the following:
creating an input array containing one or more parameters;
using a scoring algorithm to obtain a closest neighboring array by comparing the input array to a plurality of known arrays;
for at least one parameter of the input array, using the closest neighboring array and at least one other neighboring array to determine a variation in estimated processing time, wherein the at least one other neighboring array is selected from the plurality of known arrays excluding the known array selected as the closest neighboring array, and wherein at least one other neighboring array is found for each parameter in the input array that is not identical to an associated parameter in the closest neighboring array; and
providing a processing time estimate that is a combination of the processing time of a closest neighboring array and the variation in estimated processing time.

53. A computer program product as claimed in claim 52, wherein each known array has an associated known processing time.

54. A computer program product as claimed in claim 52, wherein the scoring algorithm produces a score for each known array.

55. A computer program product as claimed in claim 52, wherein each other neighboring array is found by finding a known array with an associated parameter value closest to the associated parameter value of the closest neighboring array.

56. A computer system, comprising:
one or more processors; and
one or more hardware storage devices having stored thereon computer-executable instructions that, when executed at the one or more processors, cause the computer system to estimate a processing time for a data processing job to be run on a data processing device, including at least the following:
creating an input array containing one or more parameters;
using a scoring algorithm to obtain a closest neighboring array by comparing the input array to a plurality of known arrays;
for at least one parameter of the input array, using the closest neighboring array and at least one other neighboring array to determine a variation in estimated processing time, wherein the at least one other neighboring array is selected from the plurality of known arrays excluding the known array selected as the closest neighboring array, and wherein at least one other neighboring array is found for each parameter in the input array that is not identical to an associated parameter in the closest neighboring array; and
providing a processing time estimate that is a combination of the processing time of a closest neighboring array and the variation in estimated processing time.

57. A computer system as claimed in claim 56, wherein each known array has an associated known processing time.

58. A computer system as claimed in claim 56, wherein more than one other neighboring array is found for each parameter in the input array that is not identical to the associated parameter in the closest neighboring array, wherein each other neighboring array includes an associated known processing time, and wherein a curve fitting algorithm is used to calculate the variation in estimated processing time.

* * * * *